3,461,204
METHOD OF TREATING HEPATIC ENCEPHALOPATHY
Johannes Bircher, Zurich, Switzerland, assignor, by mesne assignments, to U.S. Philips Corporation, New York, N.Y., a corporation of Delaware
No Drawing. Filed Apr. 20, 1967, Ser. No. 632,193
Int. Cl. A61k 27/00
U.S. Cl. 424—180                    3 Claims

ABSTRACT OF THE DISCLOSURE

Reduction in symptoms of hepatic encephalopathy by the oral administration of lactulose.

---

This invention relates to a method for the reduction of symptoms caused by hepatic encephalopathy.

Chronic portal-systemic encephalopathy or hepatic encephalopathy is an incapacitating disease manifested by various neuropsychiatric symptoms such as confusion, coma and flapping tremor.

In order to reduce these symptoms, one known method is to severely restrict the dietary proteins. However, this method has not proved successful as it results in the exaggeration of an already existing negative protein balance. Another known method is the long term administration of neomycin in order to reduce the concentration of the harmful facterial flora in the large intestine. However, this method is complicated by the appearance of diarrhea, steatorrhea, moniliasis and staphylococcal enterocolitis.

According to the invention it has been found that the above-noted and other symptoms of hepatic encephalopathy may be reduced or eliminated by the oral daily administration of at least about 7.075 grams of lactulose per kilogram body weight.

It has been found that not only does the oral administration of lactulose reduce or eliminate many of the aforementioned neuropsychiatric symptoms of hepatic encephalopathy but does not lead to the complications caused by the administration of neomycin. Further, the administration of lactulose has the decided advantage of permitting a large increase in the dietary proteins.

While the lactulose should be administered in daily amounts of at least 0.75 grams per kilogram body weight, it has been found that best results in adult patients are achieved at daily doses of 50–100 grams of the lactulose, preferably administered three–five divided doses a day.

The lactulose may be administered in solid form either alone or mixed with a carrier such as glucose, galactose or lactose. However, a very satisfactory method is to administer the lactulose in the form of a syrup for example one containing per 100 ml. 50 grams of lactulose, 14 grams of lactose and 6 grams of galactose.

The invention will now be described in greater detail with reference to the following example:

A 51-year-old male patient was diagnosed as having a hepatic encephalopathy due to a Leannec's cirrhosis. This patient showed the following clinical symptoms; confusion, marked tremor including asterixis, lethargy and somnolence. An attempt was made to control these symptoms through the administration of neomycin and the limitation of dietary proteins to only 25 grams daily. However, this method proved inadequate and had to be given up because of the development of malabsorption and a staph septicemia.

The patient was then treated by the daily oral administration of 90 cc. of a syrup containing per 100 cc. 50 grams of lactulose, 14 grams of lactose and 6 grams of galactose. This syrup was administered three times a day. After two weeks of the treatment with lactulose the asterixis, lethargy, confusion and somnolence were eliminated and only a very slight tremor remained. Further, his tolerance of protein increased, so that he was able to tolerate 50–60 grams of protein daily.

What I claim is:
1. A method of controlling symptoms of hepatic encephalopathy in mammals comprising orally administering to a mammal having hepatic encephalopathy a daily dose of at least about 0.75 grams of lactulose per kilogram body weight.
2. The method of claim 1 wherein a daily dose of about 50–100 grams of lactulose is administered in the case of adult patients.
3. The method of claim 2 wherein the lactulose is administered in three to five divided doses daily.

References Cited
Chemical Abstracts, vol. 52, pp. 20720–20721a (1958).

ALBERT T. MEYERS, Primary Examiner
S. J. FRIEDMAN, Assistant Examiner

UNITED STATES PATENT OFFICE
CERTIFICATE OF CORRECTION

Patent No. 3,461,204  Dated August 12, 1969

Inventor(s) Johannes Bircher

It is certified that error appears in the above-identified patent and that said Letters Patent are hereby corrected as shown below:

Column 1, line 30, "facteria" should read -- bacteria.

Column 1, line 36, "7.075" should read -- 0.75 --.

Signed and sealed this 23 day of June 1970.

(SEAL)
Attest:

Edward M. Fletcher, Jr.
Attesting Officer

WILLIAM E. SCHUYLER, JR.
Commissioner of Patents